Nov. 14, 1933.  J. ALBRECHT  1,935,199
PROCESS FOR FREEING SOIL FROM WEEDS
Filed Jan. 8, 1931   2 Sheets-Sheet 2
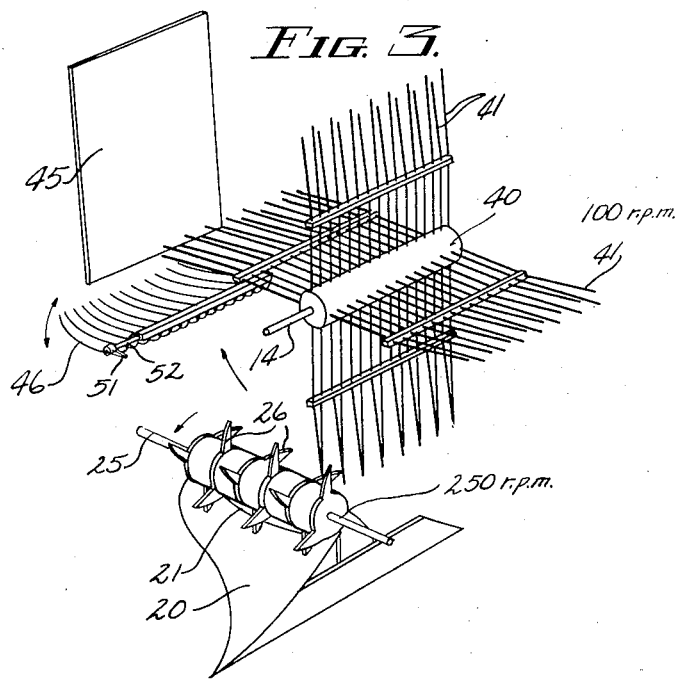
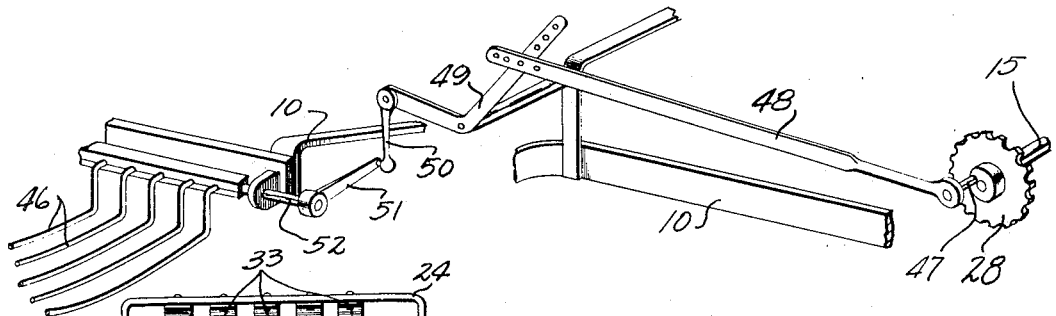
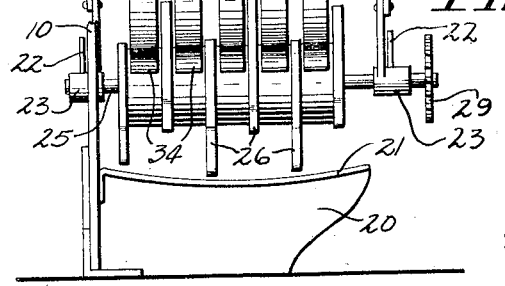
Inventor
John Albrecht
By Wheeler, Wheeler & Wheeler
Attorneys Patented Nov. 14, 1933

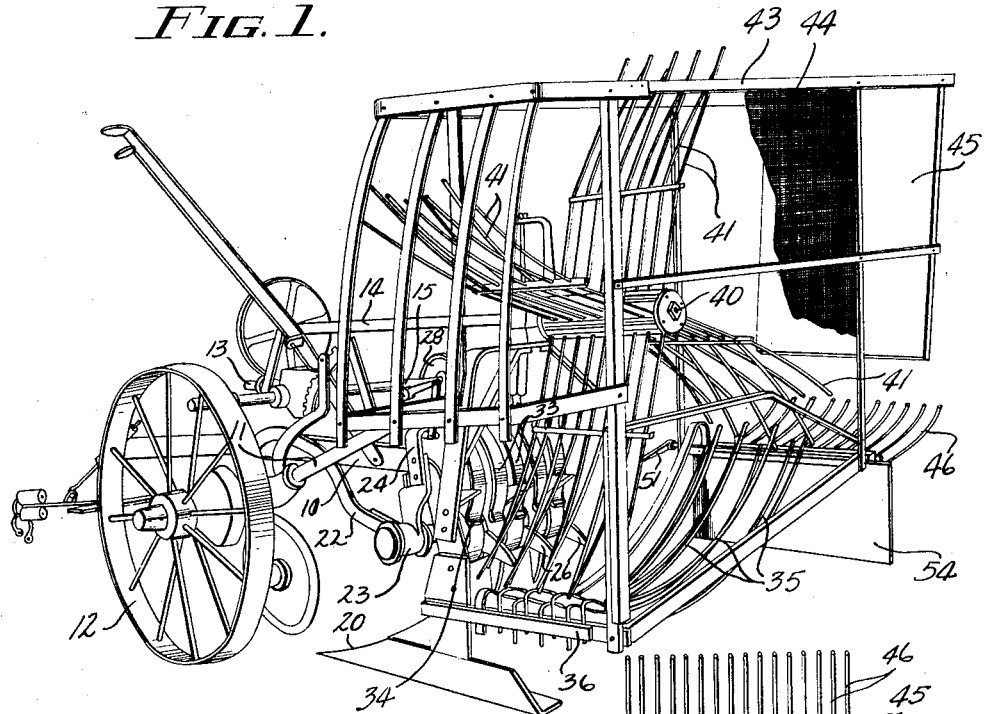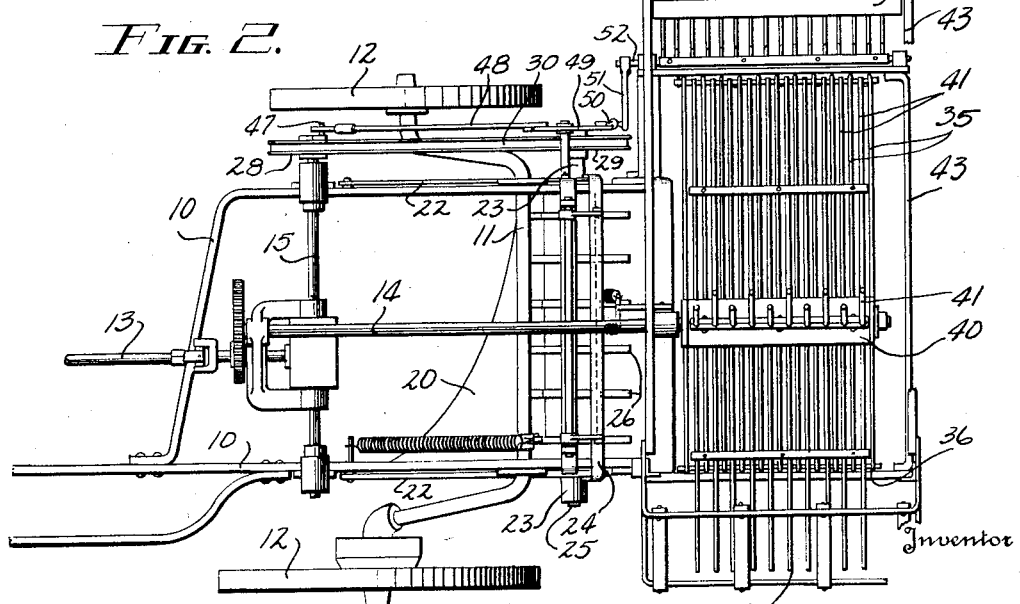

1,935,199

UNITED STATES PATENT OFFICE 1,935,199

PROCESS FOR FREEING SOIL FROM WEEDS

John Albrecht, Kewaunee, Wis.

Application January 8, 1931. Serial No. 507,339

6 Claims. (Cl. 97—10)

This invention relates to improvements in process for freeing soil from weeds.

I provide a machine which will dig weeds such as quack grass, and by means of the process hereinafter disclosed it is my object to ensure the separation of the roots of the weeds from the soil, and deposit the weeds upon the top of the soil with their roots fully exposed, whereby practically all of the plants will die.

More specifically stated, it is my purpose to eliminate all soil from the roots of the weeds by first plowing and pulverizing the soil containing the weeds, projecting the soil and plants unsupported through space, and striking each plant and particle of soil with substantial impact in a transverse direction while it is moving unsupported through space. By thus delivering a sharp blow upon each particle of material while it is free to disintegrate and to move in any direction under the impact, I am able to free the roots almost completely from soil accumulated thereon and by discharging the roots, together with stone or other unbreakable material against a baffle and dropping the mass upon a vibrating riddle, I complete the separation.

It is a further important object of the invention to prevent the entanglement of roots or other portions of the plants with any part of the apparatus. This objective is accomplished differently at different points in the path of travel of the material.

In the drawings:

Figure 1 is a rear quarter perspective view of apparatus embodying this invention.

Figure 2 is a plan view of the apparatus.

Figure 3 is a diagrammatic front quarter perspective of the operating parts to show the path of travel of the material through the machine.

Figure 4 is a diagrammatic front quarter perspective of the operating connections for the riddle.

Figure 5 is a detail view in rear elevation of the plow blade, the rotary pulverizer associated therewith, and the guards which protect the parts from entanglement with the roots.

Like parts are identified by the same reference characters throughout the several views.

The frame 10 is supported by axle 11 and wheels 12. It is adapted to be drawn by a tractor and is provided with a drive shaft 13 arranged to receive power from the tractor and to deliver such power to reel shaft 14 and jack shaft 15. In practice the jack shaft operates at about 150 R. P. M., and it has been found advantageous to operate the reel shaft at about 100 R. P. M.

Carried by frame 10 is a plow 20 of the digging or so-called shovel type. The upper margin 21 of the plow is slightly concave as shown in Fig. 5.

Pivoted to the main frame 10 is a sub-frame comprising arms 22, bearings 23, and yoke 24 which spans the main frame.

Journaled in the bearings 23 is a shaft 25 carrying pulverizing blades 26 which are best illustrated in Fig. 3, and which also appear clearly in Figs. 1 and 5. Jack shaft 15 and shaft 25 are provided with sprockets 28 and 29 respectively, over which operates a chain 30 to drive the pulverizer shaft 25 at a speed which may conveniently be 250 R. P. M. It will be noted that the teeth 26 near the center of the cultivator shaft are slightly longer than the teeth at the end thereof, so as to operate closely to the upper margin 21 of the plow 20. The direction of rotation of the shaft is shown by an arrow in Fig. 3.

The rapid rearward motion of the pulverizing teeth 26 across the upper end of the plow share tends to disintegrate clods of earth and masses of roots passing over the upper end of the plow. Furthermore, the rapidity of rotation of teeth 26 is such that the entire mass of material lifted by the plow is projected rearwardly from the plow and passes in a stream substantially horizontally from the rear and upper margin thereof.

The roots would tend to become tangled upon the teeth 26 if it were not for the provision of guard fingers 33 which are connected with yoke 24 and interposed between each set of teeth 26. The terminal portion of each finger is bent to lie as shown at 34 upon the ring-like spacers which separate the tooth carrying members on shaft 25. The fingers 33 so far fill the space between the tooth carrying members that any roots tending to catch upon a given tooth are sheared off in passing the adjacent fingers 33. It is found that the use of such fingers prevents any tangling of roots upon the cultivator, whereas without the fingers frequent stops to disengage roots from the cultivator are commonly necessary.

As the stream of material raised by the plow is projected rearwardly by the rapid rotation of the cultivator teeth 26, it passes above a set of flexible supporting prongs 35. These are anchored at one end only, in bracket 36 which projects rearwardly from the plow post. Prongs 35 are curved in general concentricity with the reel shaft 14, and the ends of the prongs remote from bracket 36 are left free to facilitate the yielding of the prongs in the event that a stone becomes caught therebetween.

A further important advantage in the absence of supports for the free ends of bars 35 consists in the fact that any supports used for the free ends of these bars would tend to become encumbered with roots of some weeds such as quack grass, which has a particular strong, tough root.

The stream of material lifted by the plow would pass completely across the set of prongs 35 if it were not for the operation of the reel 40 which is mounted on shaft 14 and preferably includes four or more sets 41 of radially extending rods. The number of sets required will depend to some degree upon the rate of rotation of the reel shaft 14, and should be so proportioned to that rate of rotation and the axial extent of the reel that no material delivered from the plow will be able to fall out of the path of the reel before being struck, while in mid air, by the rods of one of the sets 41. Each of the rods is preferably several feet in length, and at the indicated rate of rotation these rods strike the stream of material with considerable impact, which is ordinarily sufficient to break up any lumps of earth and any tangle of roots. The operation of the rods 41 is particularly effective in disengaging the roots from the earth because of the fact that the earth and roots are in mid air at the time they are struck by the rods, and hence are free to yield in the direction of the impact.

This operation may be regarded as a flailing process in which the material flailed has no resistance other than its own inertia. The material comprises a mass of roots and soil already broken up by the cultivating teeth. By the term "flailing" I mean an operation in which the material gets a series of very hard swift impacts, such as would reduce potatoes, beets, and other root vegetables to a pulp and which does completely disintegrate even a very hard soil without, however, materially disrupting the tough fibers of weed roots which the apparatus and process are specifically designed to separate from the soil.

I regard as important the facts that the material is in mid air when flailed, that by the flailing the direction taken by the roots and other fibrous matter caught upon the flailing rods is abruptly changed from the direction taken by the rearwardly and downwardly falling disintegrated earth, and that the action of the flailing rods is such as to deliver the weed roots at one side of the path of the machine where they are discharged entirely separately from the earth and cannot be recovered thereby.

Most of the material struck by rods 41 will be hurled thereby in a direction transverse to the path of travel of the machine. This direction will be toward the right as the machine is viewed in Fig. 1, or to the left as the machine is diagrammatically illustrated in Fig. 3. The direction of the impact against some of the material, however, will have a downward inclination and the material thrown downwardly will be supported by the bars 35 across which the rods will rake the material to force stones and loose earth through the bars while hurling the roots and any remaining particles of earth laterally and upwardly. If desired, the reel may be enclosed in a frame 43 covered with screen cloth or the like 44 to minimize the possibility of danger from stones which may be struck at such an angle as to throw them free of the machine.

The top of frame 43 supports a baffle 45 which depends therefrom in the path of the material hurled laterally by the revolving reel 41. Dirt, roots and stones strike this baffle with such force that the last remaining particles of earth are pulverized. All of the loose matter thus striking the baffle drops upon a riddle 46 which is violently agitated by the actuating connection shown in Fig. 4, including a crank pin 47 on jack shaft 15, a connecting rod 48 engaged with the crank pin, a bell crank 49 adjustably pivoted to the connecting rod, a link 50 carried by the bell crank, and an arm 51 on the shaft 52 of the riddle.

As stated above, the material reaching the riddle will consist of loose roots and free pulverized earth. During the violent agitation of the riddle the earth will drop through the riddle and the roots will gradually work off the free end of the riddle where they will fall fully exposed on top of the ground. To ensure that these roots are not covered by loose earth hurled through the bars 35 at the time of first impact of the reel with the earth, a baffle board is used at 54.

In the use of a machine embodying this invention the soil will be left in a highly pulverized and adequately plowed condition ready for the sowing of seed therein. Substantially all plants which were in the soil at the time the machine passed over it will be piled in windrows along the path followed by the riddle 46, with their roots fully exposed.

In practice there is very little possibility for accumulation of plants or roots upon any part of the machine, such accumulations being prevented by fingers 33 so far as the cultivator teeth are concerned, and by the freedom of the ends of bars 35 toward which the reel operates.

I attribute much of the success of the machine to the thorough pulverization of the material as it passes over the top margin of the plow and the subsequent impact of the reel on the material while it is in free air, unsupported and free to break or yield under the impact. Roots yield in most instances without breaking,—an important factor in dealing with roots whereof every joint will grow if covered with earth.

I claim:

1. The method of freeing soil from plants, which consists in plowing up the soil and plants, breaking up the soil, discharging it into space, and flailing it transversely while unsupported in free space with an impact sufficient to disintegrate the lumps of soil and free the plants therefrom.

2. The method of freeing soil from roots, which consists in elevating the plants and roots to be treated, projecting them rearwardly in free space and flailing substantially the entire masses of plants and roots substantially at right angles transversely to their path of movement in space with sufficient impact to disintegrate lumps of soil and free roots therefrom.

3. The method of freeing soil from roots, which consists in elevating the plants and roots to be treated, discharging them in free space and flailing them substantially at right angles transversely to their path of movement in space with sufficient impact to disintegrate lumps of soil and free roots therefrom, and subsequently effecting substantially complete separation of the soil and roots.

4. The method of freeing soil from roots, which consists in elevating the plants and roots to be treated, discharging them in free space and flailing them substantially at right angles transversely to their path of movement in space with sufficient impact to disintegrate lumps of soil and free roots therefrom, and subsequently agitating the free roots and soil to shake the soil from the roots and subsequently discharging the roots on top of the soil.

5. The method of freeing soil from weeds and roots which consists in elevating the mass of soil and contained roots, supporting such mass while disintegrating it, projecting the mass unsupported into free space, and flailing the mass transversely of its line of movement through space with sufficient impact to disintegrate lumps of soil and free roots therefrom.

6. The method of freeing soil from weeds and roots which consists in elevating the mass of soil and contained roots, supporting such mass while disintegrating it, projecting the mass unsupported into free space, flailing the mass transversely of its line of movement through space with sufficient impact to disintegrate lumps of soil and free roots therefrom, separating the roots from the disintegrated soil, and discharging the roots on top of the soil.

JOHN ALBRECHT.